United States Patent
Pelgrom et al.

(10) Patent No.: US 8,022,752 B2
(45) Date of Patent: Sep. 20, 2011

(54) VOLTAGE REFERENCE CIRCUIT FOR LOW SUPPLY VOLTAGES

(75) Inventors: Marcel J. M. Pelgrom, Helmond (NL); Hendricus J. M. Veendrick, Heeze (NL); Victor Zieren, Valkenswaard (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 12/651,408

(22) Filed: Dec. 31, 2009

(65) Prior Publication Data

US 2011/0156804 A1 Jun. 30, 2011

(51) Int. Cl.
G05F 1/10 (2006.01)
(52) U.S. Cl. ......................... 327/539; 327/536
(58) Field of Classification Search ................... 327/513, 327/536, 539
See application file for complete search history.

(56) References Cited

U.S. PATENT DOCUMENTS

| | | | |
|---|---|---|---|
| 6,462,612 B1 * | 10/2002 | Roh et al. ....................... | 327/539 |
| 7,012,461 B1 | 3/2006 | Chen et al. | |
| 7,583,135 B2 * | 9/2009 | Ashburn et al. ............... | 327/539 |
| 7,589,513 B2 * | 9/2009 | Ogiwara et al. .............. | 323/314 |
| 2004/0124824 A1 | 7/2004 | Proll et al. | |

FOREIGN PATENT DOCUMENTS

JP 59005320 A 1/1984

OTHER PUBLICATIONS

H. Banba, H. Shiga, A. Umezawa, T. Miyaba, T. Tanzawa, S. Atsumi, and K. Sakui, "A CMOS Bandgap Reference Circuit with Sub-1-V Operation", IEEE Journal of Solid-State Circuits, vol. 34, No. 5, May 1999 pp. 670-674.

V. Petrescu, M.J.M. Pelgrom, H.J.M. Veendrick, P. Pavithran, J. Wieling, "Monitors for a signal integrity measurement system", Proceedings of the 32nd European Solid-State Circuits Conference, Sep. 2006, pp. 122-125.

A. M. Abo, P. R. Gray, "A 1.5-V, 10-bit, 14.3-MS/s CMOS Pipeline Analog-to-Digital Converter", IEEE Journal of Solid-State Circuits, vol. 34, No. 5, May 1999, pp. 599-606.

* cited by examiner

Primary Examiner — Jeffrey S Zweizig

(57) ABSTRACT

A voltage reference circuit and method for generating a reference voltage using the circuit uses a comparison of the voltages on first and second nodes of a diode resistor network to produce a comparison signal, which is then used to increase the voltage on an output of a charge pump to generate the reference voltage.

17 Claims, 5 Drawing Sheets

VOLTAGE REFERENCE CIRCUIT FOR LOW SUPPLY VOLTAGES

Voltage reference circuits are used to provide reference voltages in integrated circuits for various applications. The most common voltage reference circuits used in integrated circuits are bandgap circuits, which generally produce 1.2-1.3 volt reference output.

In FIG. 1, a bandgap circuit 100 of interest in accordance with the prior art is shown. The bandgap circuit includes a diode resistor network 102 and an operational amplifier 104. The diode resistor network 102 includes two diodes 106 and 108 and three resistors 110, 112 and 114. The resistor 110 and the diode 106 are connected in series on a first conductive path, which includes a node 116 located between the resistor 110 and the diode 106. The resistors 112 and 114 and the diode 108 are connected in series on a second conductive path, which includes a node 118 located between the resistors 112 and 114. The nodes 116 and 118 of the diode resistor network 102 are connected to the two inputs of the operational amplifier 104. A reference voltage is generated at the output of the operational amplifier 104, which is connected back to the resistors 110 and 112 of the diode resistor network 102.

A problem with the bandgap circuit 100 of FIG. 1 is that this bandgap circuit cannot deliver the correct reference voltage when the nominal power supply voltage is 1.2 volts or lower, which is the case in certain advanced applications. A trivial solution to this concern is to generate a higher on-chip supply voltage and feed the bandgap circuit 100 of FIG. 1. However, this solution requires extra elements, such as elements to provide control frequencies, or violates the maximum voltage specifications of the process.

In view of the above concern, there is a need for a voltage reference circuit and method for generating a reference voltage for low supply voltages, e.g., 1.2 volts or lower.

A voltage reference circuit and method for generating a reference voltage using the circuit uses a comparison of the voltages on first and second nodes of a diode resistor network to produce a comparison signal, which is then used to increase the voltage on an output of a charge pump to generate the reference voltage. The voltage reference circuit and method can be used to generate a reference voltage even for low supply voltages. Another objective of this invention is to avoid high precision circuits, such as precision operational amplifiers. The use of simple comparators allows to significantly reduce the silicon area, which is important to extremely low cost applications, such as smart cards.

A voltage reference circuit in accordance with an embodiment of the invention comprises a diode resistor network that includes first and second nodes, a comparator connected to the first and second nodes of the diode resistor network to produce a comparison signal in response to the voltages on the first and second nodes, a charge pump connected to the comparator to produce an output signal at an output of the charge pump using the comparison signal from the comparator. The output of the charge pump is connected back to the diode resistor network. The charge pump is configured to increase the voltage on the output of the charge pump in response to the comparison signal to generate a reference voltage. In an implementation, the diode resistor network includes a first resistor and a first diode connected in series on a first conductive path. The first node is located between the first resistor and the first diode on the first conductive path. The diode resistor network further includes second and third resistors and a second diode that are connected in series on a second conductive path. The second node is located between the second and third resistors on the second conductive path.

A method for generating a reference voltage using a voltage reference circuit in accordance with an embodiment of the invention comprises receiving the voltages on first and second nodes of a diode resistor network of the voltage reference circuit, comparing the voltages on the first and second nodes to produce a comparison signal, producing an output signal at an output of the voltage reference circuit using the comparison signal, including increasing the voltage on the output of the voltage reference circuit in response to the comparison signal to generate the reference voltage, and feeding the output signal back to the diode resistor network.

Other aspects and advantages of the present invention will become apparent from the following detailed description, taken in conjunction with the accompanying drawings, illustrated by way of example of the principles of the invention.

Figure 2:
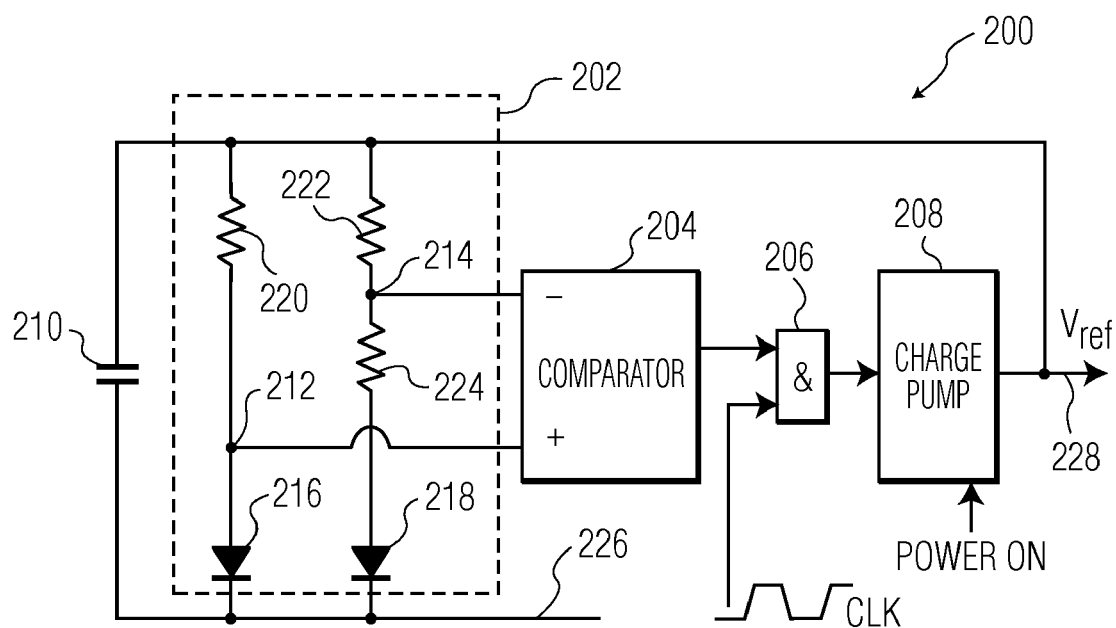
FIG. 2 is a diagram of a voltage reference circuit in accordance with an embodiment of the invention.

With reference to FIG. 2, a voltage reference circuit 200 in accordance with an embodiment of the invention is described. The voltage reference circuit 200 is designed to provide a reference voltage for low power supply voltages. As an example, the voltage reference circuit 200 may generate a reference voltage of 1.2-1.3 volts even when the power supply voltage is 1.2 volts or lower. Since the voltage reference circuit 200 operates with low power supply voltages, the voltage reference circuit does not require additional on-chip elements to raise the power supply voltage in order for the voltage reference circuit to provide the desired reference voltage.

As shown in FIG. 2, the voltage reference circuit 200 includes a diode resistor network 202, a comparator 204, an AND gate 206, a charge pump 208 and a capacitor 210. The diode resistor network 202 is designed to have two nodes 212 and 214, which show the same voltage at the desired operating point of the voltage reference circuit 200. The desired operating point of the voltage reference circuit 200 is when the voltage reference circuit is producing the correct reference voltage. In the illustrated embodiment, the diode resistor network 202 is identical to the diode resistor network 102 of the prior art bandgap circuit 100 of FIG. 1. The diode resistor network 202 includes two diodes 216 and 218 and three resistors 220, 222 and 224. The resistor 220 and the diode 216 are connected in series on a first conductive path, which includes the node 212 located between the resistor 220 and the diode 216. The resistors 222 and 224 and the diode 218 are connected in series on a second conductive path, which includes the node 214 located between the resistors 222 and 224. The diodes 216 and 218 are connected to a low voltage rail 226, which could be electrical ground. The diodes 216 and 218 and the resistors 220, 222 and 224 are configured so that the nodes 212 and 214 show the same voltage when the desired voltage is applied to the resistors 220 and 222.

The comparator 204 of the voltage reference circuit 200 includes two inputs and an output. In this embodiment, the inputs of the comparator 204 are directly connected to the nodes 212 and 214 of the diode resistor network 202. However, in other embodiments, the inputs of the comparator 204 may be indirectly connected to the nodes 212 and 214 of the diode resistor network 202. The comparator 204 operates to indicate whether the voltage on the node 212, i.e., the voltage of the diode 216, equals the voltage on the node 214 between the resistors 222 and 224. The comparator 204 is designed to output a comparison signal of a logical one if the voltage difference on the inputs is positive and to output a comparison signal of a logical zero if the voltage difference on the inputs is negative. The comparator 204 can be any type of a comparator. Thus, the comparator 204 may be clocked or not clocked, regenerative or gain-stage, offset-compensated or with minimum dimension. In an implementation, the comparator 204 may be a comparator using a free-running oscillator, such as a comparator 304 shown in FIG. 3. A free-running oscillator generates a frequency determined by internal time constants, e.g., a resistor and a capacitor, in contrast to an oscillator based on the resonance frequency of an external crystal.

Figure 3:
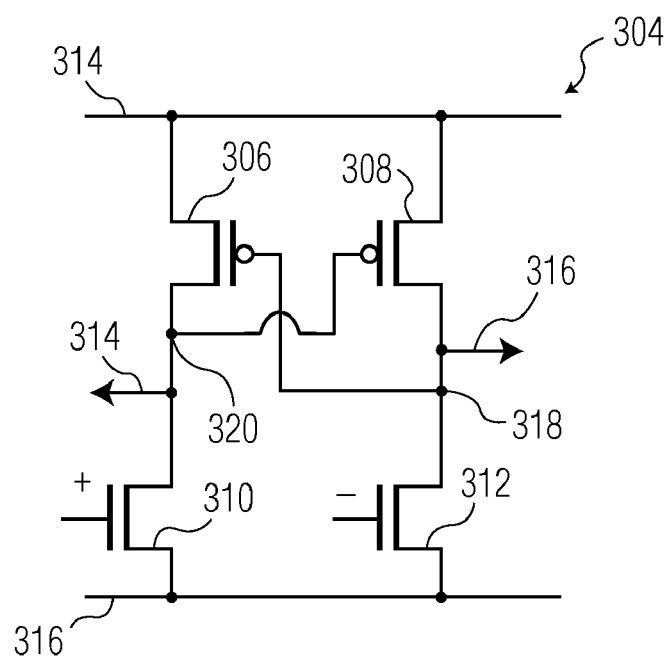
FIG. 3 is a circuit diagram of a comparator that can be used in the voltage reference circuit of FIG. 2 in accordance with an embodiment of the invention.

The comparator 304 of FIG. 3 includes two PMOS transistors 306 and 308 and two NMOS transistors 310 and 312 that are connected between a high voltage rail 314, which provides the power supply voltage, and a low voltage rail 316, which may be electrical ground. The PMOS transistor 306 and the NMOS transistor 310 are connected in series between the high voltage rail 314 and the low voltage rail 316. The PMOS transistor 308 and the NMOS transistor 312 are connected in a similar manner. The gate of the PMOS transistor 306 is connected to a point 318 between the PMOS transistor 308 and the NMOS transistor 312. Similarly, the gate of the PMOS transistor 308 is connected to a point 320 between the PMOS transistor 306 and the NMOS transistor 310. The gates of the NMOS transistors 310 and 312 are the two inputs of the comparator 304. The comparator 304 includes two outputs 314 and 316, which are connected to the points 320 and 318, respectively. Only one of the two outputs 314 and 316 is used to provide an output comparison signal to the AND gate 206. As an example, the output 316 may be used to provide the output comparison signal of the comparator 304. This implementation of the comparator 304 is not crucial to the invention. Any other comparator with an input range of between 0.3 and 0.7 volts can be used in the voltage reference circuit 200.

Turning back to FIG. 2, the AND gate 206 of the voltage reference circuit 200 includes two inputs and an output. One of the inputs is connected to the output of the comparator 204 to receive the output comparison signal from the comparator. The other input is connected to receive a clock signal Clk so that the output signal on the output of the AND gate 206 is clocked. Thus, the AND gate 206 operates to convert the comparison signal of the comparator 204 to a clocked comparison signal.

The charge pump 208 is connected to the output of the AND gate 206 to receive the clocked comparison signal from the AND gate. The charge pump 208 is configured to produce an output signal at an output 228, which is the output for the voltage reference circuit 200. Thus, the charge pump 208 operates to produce the desired reference voltage on the output 228 using the received clocked comparison signal from the AND gate 206. The output of the charge pump 208 is connected to the resistors 220 and 222 of the diode resistor network 202, as well as the capacitor 210, which is connected to the low voltage terminal 226. Thus, the output signal of the charge pump 208 is fed back to the diode resistor network 202. The charge pump 208 can be any type of a charge pump. An example of a charge pump 408 that can be used in the voltage reference circuit 200 is shown FIG. 4. This charge pump is known from "A 1.5-V, 10-bit, 14.3-MS/s CMOS Pipeline Analog-to-Digital Converter" by A. M. Abo and P. R. Gray, *IEEE Journal of Solid-State Circuits*, Vol. 34. No. 5, May 1999, pp. 599-606.

Figure 4:
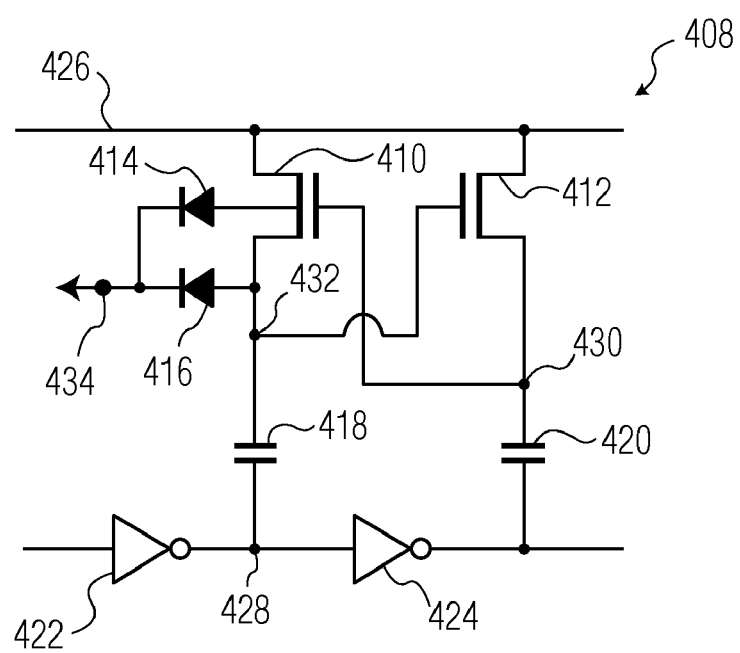
FIG. 4 is a circuit diagram of a charge pump that can be used in the voltage reference circuit of FIG. 2 in accordance with an embodiment of the invention.

As shown in FIG. 4, the charge pump 408 includes two NMOS transistors 410 and 412, two diodes 414 and 416, two capacitors 418 and 420 and two inverters 422 and 424. The two inverters 422 and 424 are connected in series. The input of the charge pump 408 is the input to the inverter 422. The NMOS transistor 410 and the capacitor 418 are connected in series between a high voltage rail 426, which provides the power supply voltage, and the output of the inverter 422 at a point 428 between the two inverters 422 and 424. The NMOS transistor 412 and the capacitor 420 are connected in series between the high voltage rail 408 and the output of the inverter 424. The gate of the NMOS transistor 410 is connected to a point 430 between the NMOS transistor 412 and the capacitor 420. Similarly, the gate of the NMOS transistor 412 is connected to a point 432 between the NMOS transistor 410 and the capacitor 418. The gate of the NMOS transistor 410 is also connected to the anode of the diode 414. The anode of the diode 416 is connected the point 432 between the NMOS transistor 410 and the capacitor 418. The cathodes of the diodes 414 and 416 are both connected together, and serve as the output of the charge pump 408.

In operation, the inverters 422 and 424 of the charge pump 408 create opposite phases of the clocked output signal from the AND gate 206. Assuming that both capacitors 418 and 420 are uncharged (V=0), if the clocked signal goes high, the output of the inverter 424 will follow and push via the uncharged capacitor 420 the gate of the NMOS transistor 410 positive. Thus, the NMOS transistor 410 will begin to conduct, which will positively charge the capacitor 418. This charging process will continue as the clocked signal at the input of the inverter 422 repeatedly goes high until both capacitors 418 and 420 are charged to the power supply voltage. In their high phase, the positive side of the capacitors 418 and 420 will reach a theoretical two times (2×) power supply voltage, which is tapped by the diodes 414 and 416 to produce the desired reference voltage.

Figure 1:
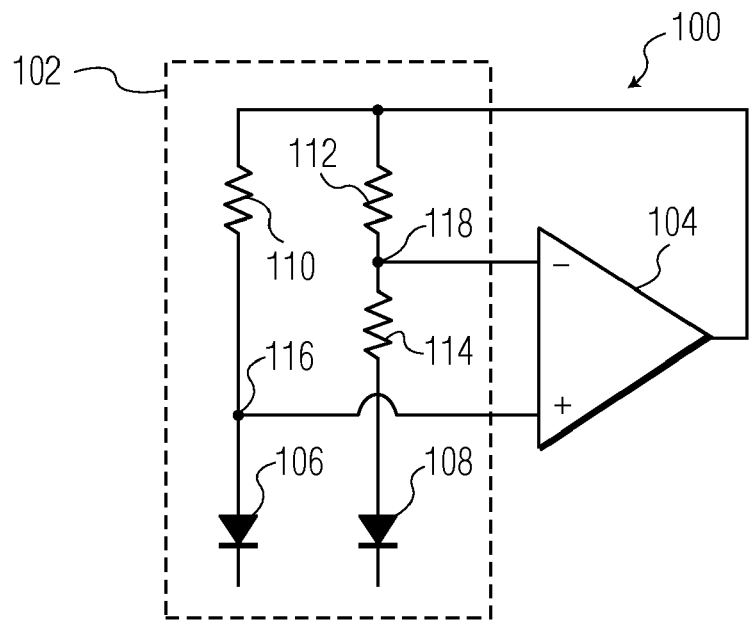
FIG. 1 is a diagram of a bandgap circuit in accordance with the prior art.

An advantage of the voltage reference circuit 200 over the conventional bandgap circuit 100 of FIG. 1 is that the charge pump 208 will create no higher voltages than needed. In the case where a pair of diode-connected transistors is used, i.e., the NMOS transistors 410 and 412, the maximum voltage will be limited to 1.2 volts plus on threshold (0.35 volts). In the case where a pair of synchronously switching PMOS transistors is used instead of the pair of diode-connected transistors, there would be hardly any excess voltage over the output voltage.

A further advantage of the voltage reference circuit 200 over the conventional bandgap circuit 100 of FIG. 1 is the use of the capacitor 210, which is a relatively large capacitor. In the bandgap circuit 100 of FIG. 1, the operational amplifier 104 has to be stabilized internally. In the voltage reference circuit 200, the single capacitor 210 connected to the output 228 in combination with the capacitors 418 and 420 of the charge pump 408, along with the frequency of the clock supplied to the AND gate 206, determines the ramping speed and the remaining voltage ripple, and thus, stabilizes the voltage reference circuit.

Another advantage of the voltage reference circuit 200 over the conventional bandgap circuit 100 of FIG. 1 is that the voltage reference circuit does not require a start-up circuit. In the bandgap circuit 100 of FIG. 1, a stable operating point exists at the required output voltage, as well as when voltages at all the nodes equal to zero. Thus, the bandgap circuit 100 of FIG. 1 requires a start-up circuit. However, in the voltage reference circuit 200, start-up can easily be implemented by applying a power-on pulse to the charge pump 208, for example, at a node 434 of the charge pump 408 connected to the diodes 414 and 416.

Figure 5:
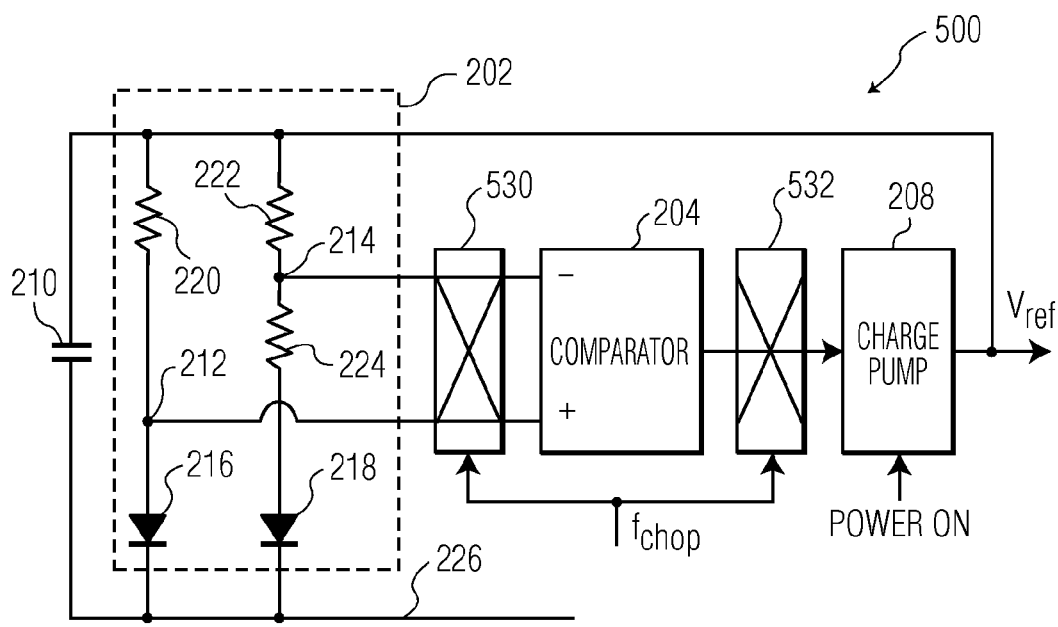
FIG. 5 is a diagram of a voltage reference circuit in accordance with another embodiment of the invention.

Turning now to FIG. 5, a voltage reference circuit 500 in accordance with another embodiment of the invention is shown. The voltage reference circuit 500 includes most of the components of the voltage reference circuit 200 of FIG. 2. However, in this embodiment, the voltage reference circuit 500 further includes two chopping stages 530 and 532 that are positioned such that the comparator 204 is situated between the two chopping stages. In this embodiment, the AND gate 206 is omitted. The two chopping stages 530 and 532 will interchange inputs and outputs of the comparator 204 using a chopping frequency $f_{chop}$. In an embodiment, the chopping stages 530 and 532 are implemented using two sets of switches. One set of switches is positioned between the diode resistor network 202 and the inputs of the comparator 204, i.e., at the chopping stage 530. The other set of switches is positioned between the output of the comparator 204 and the charge pump 208, i.e., at the chopping stage 532. The switch sets serve to invert the polarity of the signals. In the entire chain, the polarity is twice inverted so that an external signal should not notice any chopping mechanism. However, offset, noise etc. added inside the comparator 204 will see only the output switches, which modulate them up in frequency, removing them from, e.g., the DC level. Thus, the chopping stages 530 and 532 operate to keep out the offsets of the comparator 204 in the voltage reference circuit 500.

In a normal bandgap circuit, the output voltage equals: $V_{ref}=V_{ref,ideal}+(N_{R+1})V_{offset}$, where $V_{ref,ideal}$ is the ideal reference voltage, $N_{R+1}$ is the multiplication factor for the positive temperature coefficient voltage over resistors, which is typically between 8 and 12, depending on the ratio of the diode areas, and $V_{offset}$ is the voltage offset, which is typically 3-5 mV. In the voltage reference circuit 500, the offset of the comparator 204 will become positive in one phase or the opposite phase. Because the charge pump 208 is unidirectional, the charge pump will react on the positive sign, and consequently, the offset is rectified. So the output voltage now is: $V_{ref}=V_{ref,ideal}+(N_{R+1})|V_{offset}|$, which equals half of the spread of a conventional bandgap. The offset cancellation has an additional advantage. Conventional bandgap circuits require means to start up the circuit in case of unfavorable offsets. However, in the voltage reference circuit 500, any offset will create a situation where the charge pump 208 is activated, and consequently, force the output to increase its voltage.

Figure 6:
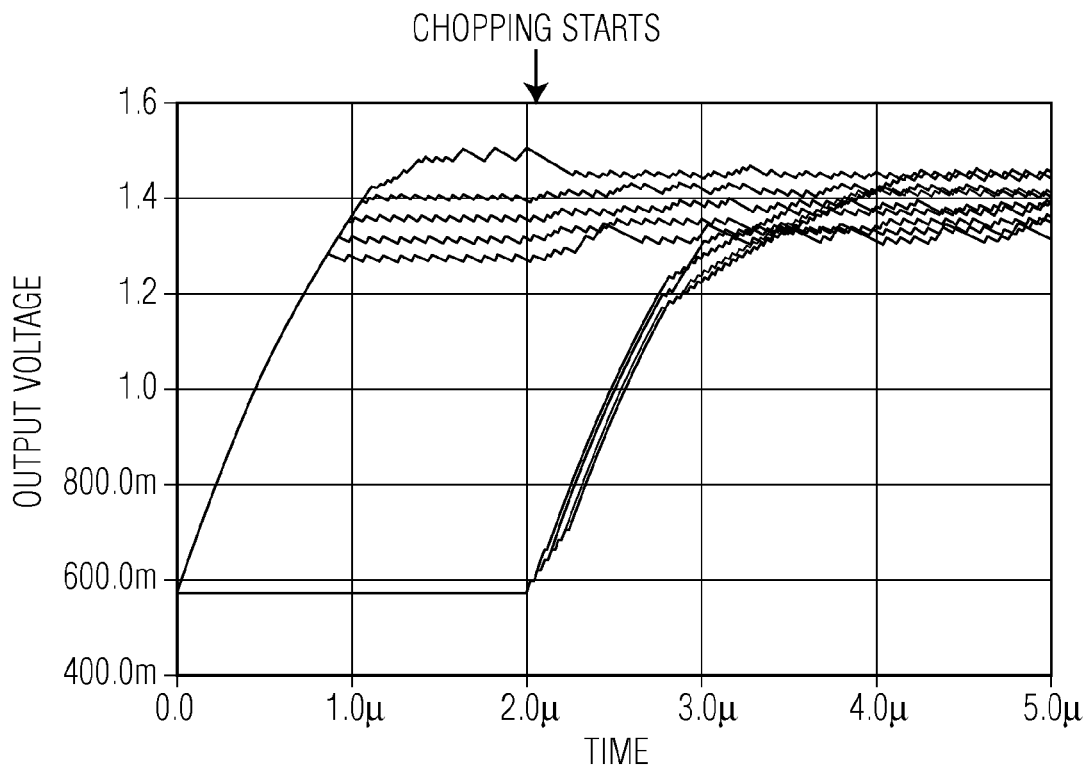
FIG. 6 shows an operational simulation of the voltage reference circuit of FIG. 5.

Turning now to FIG. 6, an operational simulation of the voltage reference circuit 500 of FIG. 5 is shown. The output of the voltage reference circuit 500 was monitored during the 5 microseconds after start. In the simulation, the offset at the input of the comparator is varied from −20 mV to +20 mV in steps of 5 mV. Only the zero and positive offsets start the voltage reference circuit 500. At time=2 microseconds, the chopping is switched on. From this point, the negative offsets also come to life. If the output is amplified, the stable value with offset=−20 mV reaches the stable value of the offset=+20 mV etc.

Although the voltage reference circuits 200 and 500 of FIGS. 2 and 5 have been described with a specific diode resistor network. In other embodiments, the voltage reference circuits 200 and 500 may include other types of diode resistor network.

Figure 7:
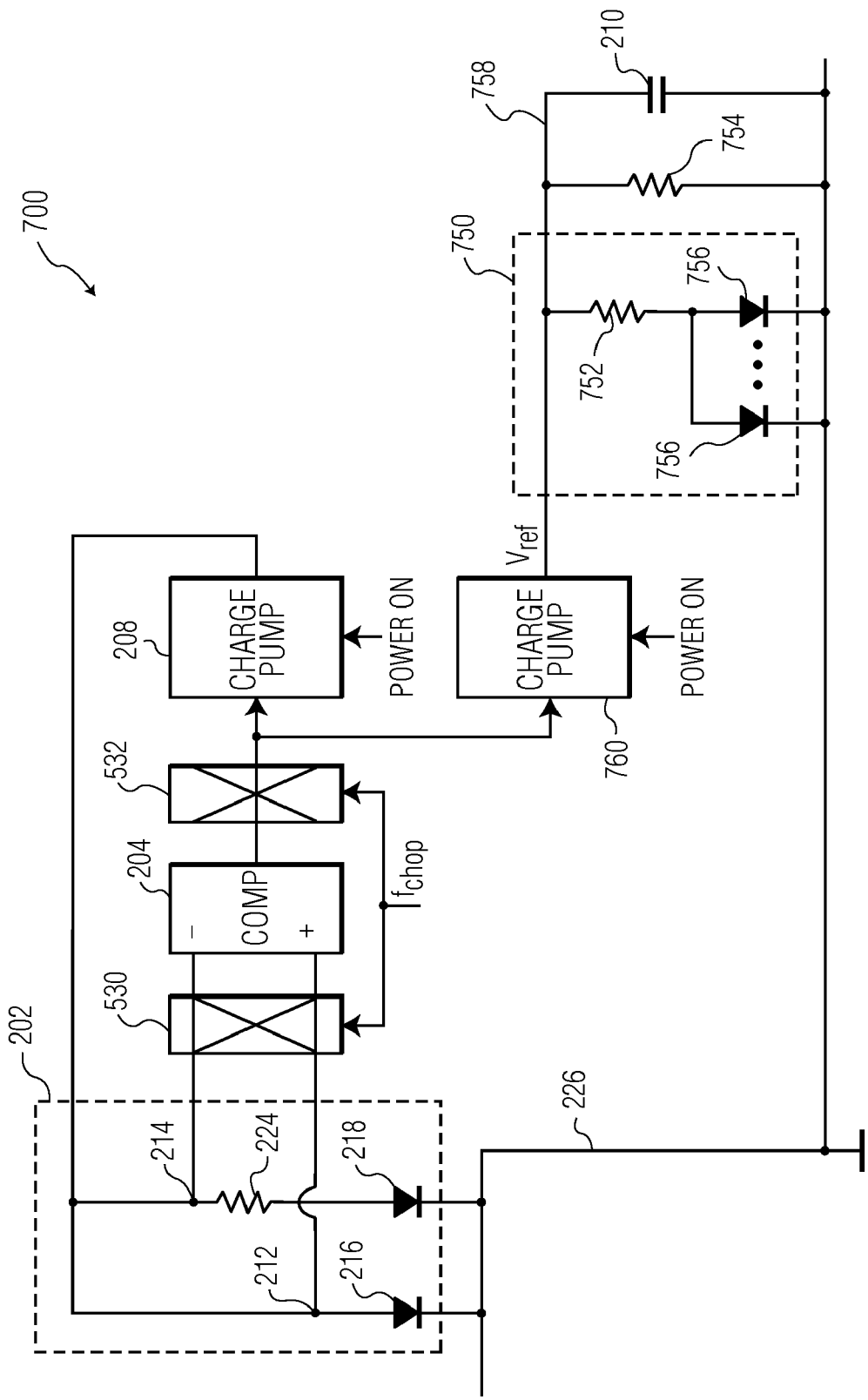
FIG. 7 is a diagram of a voltage reference circuit in accordance with another embodiment of the invention.

Turning now to FIG. 7, a voltage reference circuit 700 in accordance with another embodiment of the invention is shown. As shown in FIG. 7, the voltage reference circuit 700 includes all the components of the voltage reference circuit 500. However, in this embodiment, the diode resistor network 202 does not include the resistors 220 and 222. With these resistors 220 and 222, the voltage at the output of the charge pump 208 will go to approximately 0.7 volts over the diodes 216 and 218 plus 0.6 volts over the resistors 220, 222 and 224 for a total of 1.3 volts. However, such voltage is sometimes not desired. The voltage reference circuit 700 is designed to provide a temperature stable voltage lower than 1.3 volts.

The voltage reference circuit 700 uses a second diode resistor network 750 to provide a temperature stable voltage lower than 1.3 volts. The diode resistor network 750 includes two resistors 752 and 754 and one or more diodes 756. The diodes 756 are connected in parallel with each other and are connected in series with respect to the resistor 752 between an output terminal 758 and the low voltage rail 226. The resistor 754 is connected in parallel to the resistor 752 and the diodes 756. The diode resistor network 750 with multiple diodes is described in "A CMOS Bandgap Reference Circuit with Sub-1-V Operation," by H. Banba, H. Shiga, A. Umezawa, T. Miyaba, T. Tanzawa, S. Atsumi, and K. Sakui, IEEE Journal of Solid-State Circuits, Volume 34, No. 5, May 1999 Page(s): 670-674, which is incorporated herein by reference. The diode resistor network 750 with a single diode is described in "Monitors for a signal integrity measurement system" by V. Petrescu, M. J. M. Pelgrom, H. J. M. Veendrick, P. Pavithran, J. Wieling, Proceedings of the 32nd European Solid-State Circuits Conference, September 2006, pp. 122-125, which is incorporated herein by reference.

The voltage reference circuit 700 also includes a second charge pump 760, which is connected to receive the output signals of the comparator 204 and to output the desired reference voltage $V_{ref}$ on the output terminal 758. Thus, the input of the charge pump 760 is connected to the input of the charge pump 208, and the output of the charge pump 760 is connected to the output terminal 758. The second charge pump 760 may be identical to the charge pump 208. In this embodiment, the capacitor 210 is connected between the output terminal 758 and the low voltage rail 226 since the desired reference voltage $V_{ref}$ is on the output terminal 758.

In operation, the diode resistor network 202 serves to generate current proportional to the absolute temperature current. This positive temperature coefficient current is copied by the second charge pump 760. The diode resistor network 750 has a negative temperature coefficient. The voltage over the resistors 752 and 754 has a positive temperature coefficient due to the positive temperature coefficient of the current provided by the charge pump 760. A proper choice of resistor values allows a zero-temperature coefficient in the output voltage, i.e., the voltage on the output terminal 758.

Figure 8:
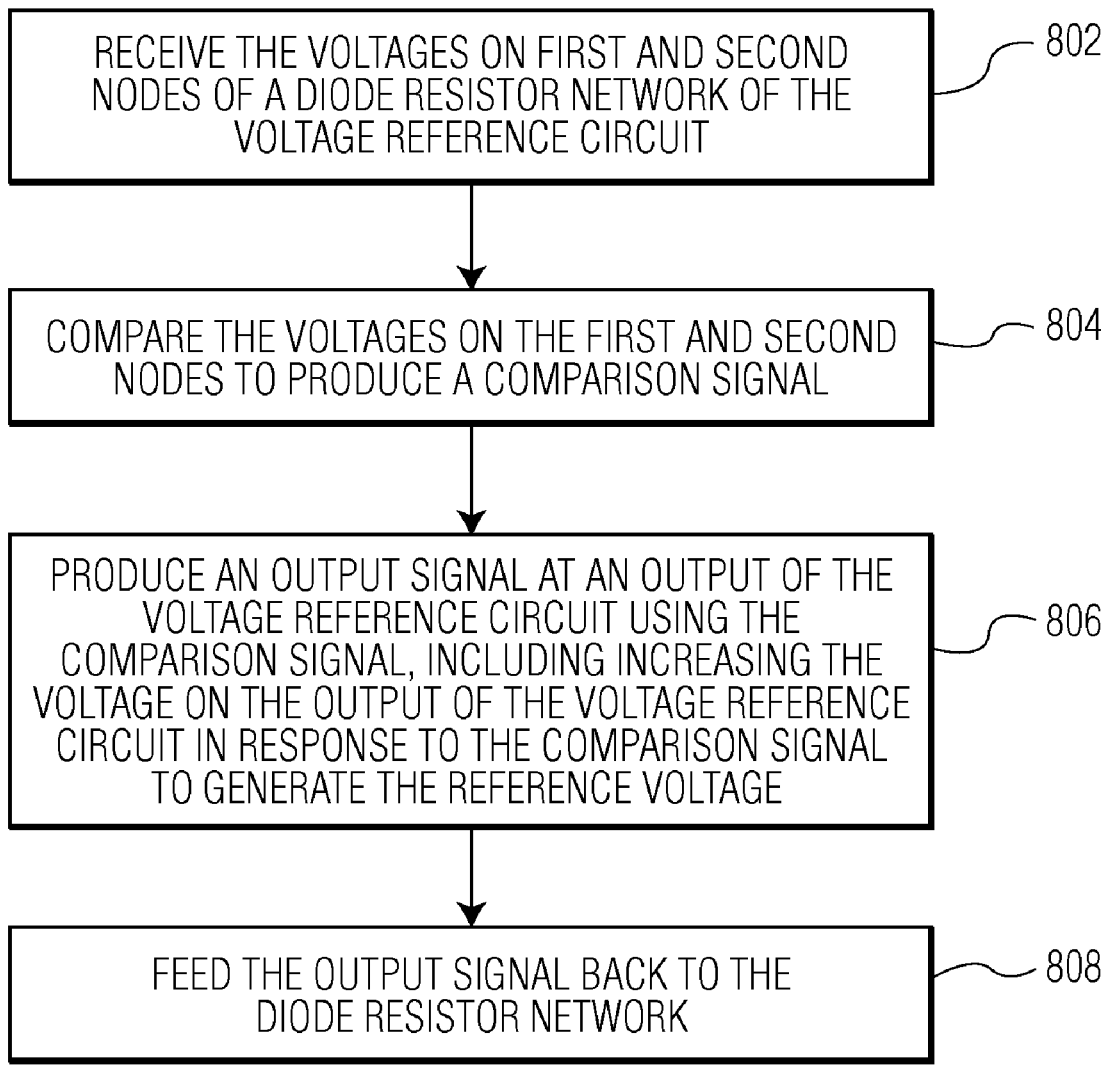
FIG. 8 is a process flow diagram of a method for generating a reference voltage using a voltage reference circuit in accordance with an embodiment of the invention.

A method for generating a reference voltage using a voltage reference circuit in accordance with an embodiment of the invention is described with reference to a process flow diagram of FIG. 8. At block 802, the voltages on first and second nodes of a diode resistor network of the voltage reference circuit are received. At block 804, the voltages on the first and second nodes are compared to produce a comparison signal. At block 806, an output signal at an output of the voltage reference circuit is produced using the comparison signal, which includes increasing the voltage on the output of the voltage reference circuit in response to the comparison signal to generate the reference voltage. At block 808, the output signal is fed back to the diode resistor network.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A voltage reference circuit comprising:
   a diode resistor network that includes first and second nodes;
   a comparator connected to the first and second nodes of the diode resistor network to produce a comparison signal in response to the voltages on the first and second nodes; and
   a charge pump connected to the comparator to produce an output signal at an output of the charge pump using the comparison signal from the comparator, the output being connected back to the diode resistor network, the charge pump being configured to increase the voltage on the output of the charge pump in response to the comparison signal to generate a reference voltage.

2. The voltage reference circuit of claim 1, further comprising an AND gate positioned between the comparator and the charge pump, the AND gate being connected to receive the comparison signal and a clock signal as inputs to transmit the comparison signal to the charge pump as a clocked signal.

3. The voltage reference circuit of claim 1, further comprising a capacitor directly connected to the output of the charge pump and to a low voltage rail, the capacitor being also connected to the diode resistor network.

4. The voltage reference circuit of claim 1, wherein the diode resistor network includes a first resistor and a first diode connected in series on a first conductive path, the first node being located between the first resistor and the first diode on the first conductive path, the diode resistor network further including second and third resistors and a second diode that are connected in series on a second conductive path, the second node being located between the second and third resistors on the second conductive path.

5. The voltage reference circuit of claim 1, further comprising a second charge pump connected to the comparator to receive the comparison signal from the comparator and a second diode resistor circuit connected to the output of the second charge pump, the reference voltage being generated at the output of the second charge pump.

6. The voltage reference circuit of claim 5, wherein the second diode resistor network includes a first resistor connected in series with one or more diodes, the second diode resistor network further including a second resistor connected in parallel with the first resistor and the one or more diodes.

7. The voltage reference circuit of claim 1, further comprising two chopping stages connected to the comparator such that the comparator is positioned between the two chopping stages, the chopping stages being configured interchange inputs and outputs of the comparator.

8. The voltage reference circuit of claim 1, wherein the comparator is a free-running comparator.

9. The voltage reference circuit of claim 1, wherein the comparator includes first and second transistors connected in series on a first conductive path, and third and fourth transistors connected in series on a second conductive path, the gate of the first transistor being connected to a first point between the third and fourth transistors, the gate of the third transistor being connected to a second point between the first and second transistors, the gates of the second and fourth transistors being inputs of the comparator, an output of the comparator being connected to one of the first and second points.

10. The voltage reference circuit of claim 1, wherein the charge pump includes first and second inverters connected in series, an input of the first inverter being an input of the charge pump, the charge pump further including a first transistor and a first capacitor connected in series from a high voltage rail to an output of the first inverter, the charge pump further including a second transistor and a second capacitor connected in series from the high voltage rail to an output of the second inverter, the gate of the first transistor being connected to a first point between the second transistor and the second capacitor, the gate of the second transistor being connected to a second point between the first transistor and the first capacitor, the charge pump further including first and second diodes connected to the first and second points, an output of the charge pump being connected to the first and second diodes.

11. A voltage reference circuit comprising:
   a diode resistor network that includes first and second nodes, the diode resistor network including a first resistor and a first diode connected in series on a first conductive path, the first node being located between the first resistor and the first diode on the first conductive path, the diode resistor network further including second and third resistors and a second diode that are connected in series on a second conductive path, the second node being located between the second and third resistors on the second conductive path;
   a comparator connected to the first and second nodes of the diode resistor network to produce a comparison signal in response to the voltages at the first and second nodes; and
   a charge pump connected to the comparator to produce an output signal at an output of the charge pump using the comparison signal from the comparator, the output being connected back to the first and second resistors of the diode resistor network, the charge pump being configured to increase the voltage on the output of the charge pump in response to the comparison signal to generate a reference voltage.

12. The voltage reference circuit of claim 11, further comprising an AND gate positioned between the comparator and the charge pump, the AND gate being connected to receive the comparison signal and a clock signal as inputs to transmit the comparison signal to the charge pump as a clocked signal.

13. The voltage reference circuit of claim 11, further comprising a capacitor directly connected to the output of the charge pump and to a low voltage rail, the capacitor being also connected to the first and second resistors of the diode resistor network.

14. The voltage reference circuit of claim 11, further comprising two chopping stages connected to the comparator such that the comparator is positioned between the two chopping stages, the chopping stages being configured interchange inputs and outputs of the comparator.

15. The voltage reference circuit of claim 11, wherein the comparator is a free-running comparator.

16. The voltage reference circuit of claim 11, wherein the charge pump includes first and second inverters connected in series, an input of the first inverter being an input of the charge pump, the charge pump further including a first transistor and a first capacitor connected in series from a high voltage rail to an output of the first inverter, the charge pump further including a second transistor and a second capacitor connected in series from the high voltage rail to an output of the second inverter, the gate of the first transistor being connected to a first point between the second transistor and the second capacitor, the gate of the second transistor being connected to a second point between the first transistor and the first capacitor, the charge pump further including first and second diodes connected to the first and second points, an output of the charge pump being connected to the first and second diodes.

17. A method for making a voltage reference circuit comprising:
- providing a diode resistor network that includes first and second nodes;
- providing a comparator connected to the first and second nodes of the diode resistor network to produce a comparison signal in response to the voltages on the first and second nodes; and
- providing a charge pump connected to the comparator to produce an output signal at an output of the charge pump using the comparison signal from the comparator, the output being connected back to the diode resistor network, the charge pump being configured to increase the voltage on the output of the charge pump in response to the comparison signal to generate a reference voltage.

* * * * *